United States Patent [19]
Jones

[11] 3,809,132
[45] May 7, 1974

[54] FOOD PACKING MACHINE
[75] Inventor: Lewis H. Jones, Anchorage, Ky.
[73] Assignee: Food Packers Equipment Company, Inc., Louisville, Ky.
[22] Filed: June 23, 1972
[21] Appl. No.: 265,711

[52] U.S. Cl. ............... 141/122, 53/36, 141/12
[51] Int. Cl. ................................ B65b 1/06
[58] Field of Search ........ 141/121, 122, 78, 88, 69, 141/11, 12, 126, 131, 163, 168, 171, 256, 324; 53/35, 36, 251, 250; 198/1, 140

[56] References Cited
UNITED STATES PATENTS

| | | | |
|---|---|---|---|
| 3,705,475 | 12/1972 | Riley | 53/35 |
| 2,806,488 | 9/1957 | Buckendorf | 141/131 |
| 3,593,838 | 7/1971 | Latone | 198/140 |
| 2,960,209 | 11/1960 | Everhart | 198/140 |
| 3,217,760 | 11/1965 | Eisenberg | 141/78 X |
| 3,556,172 | 1/1971 | Mencacci | 141/78 X |
| 3,147,780 | 9/1954 | Garriott et al. | 141/122 X |

FOREIGN PATENTS OR APPLICATIONS

| | | | |
|---|---|---|---|
| 1,023,913 | 2/1958 | Germany | 141/88 |

*Primary Examiner*—Leon G. Machlin
*Attorney, Agent, or Firm*—Nathaniel A. Humphries, Esq.

[57] ABSTRACT

A food packing machine is disclosed including an infeed food conveyor from which a plurality of deflector plates deflect food particles onto a food slide to provide a cascade of particles onto a row of empty containers moving through the cascade with excess food particles falling onto an overflow return conveyor which returns the excess food to a lifting conveyor in the form of a cleated belt member oriented in a rectangular configuration and having inwardly extending flat cleats for engaging and lifting the returned food upwardly to deposit the returned food onto the infeed conveyor for return to the filling area.

14 Claims, 3 Drawing Figures

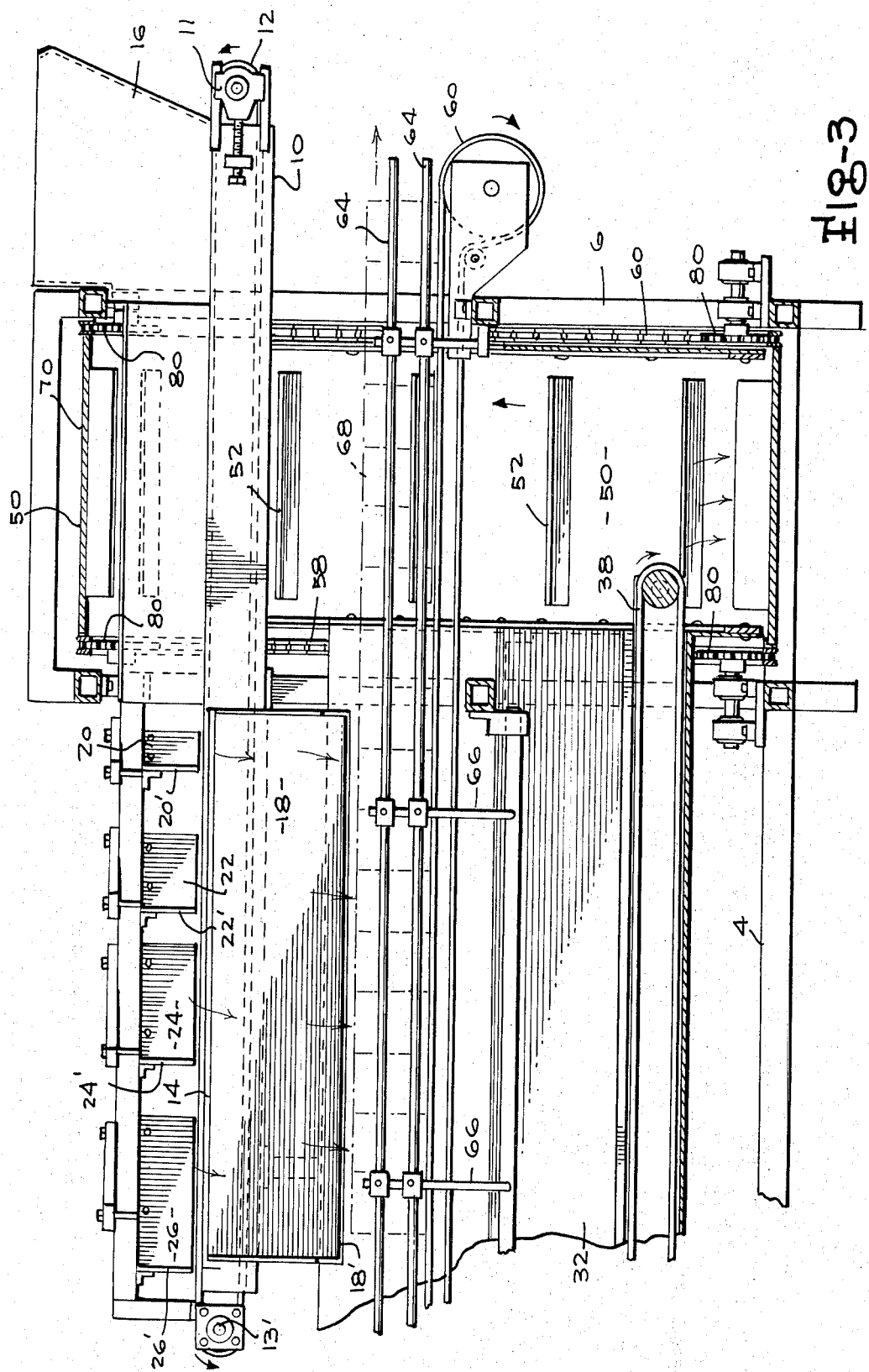

FOOD PACKING MACHINE

This invention is in the field of food handling equipment and is specifically directed to container filling apparatus of the type generally employed for filling containers with food particles. Even more specifically, the subject invention is directed to a container filling apparatus and method for filling containers with a wide variety of particles cascaded into the containers as the containers are conveyed through a filling area.

A large number of devices have been employed in the past for the filling of cans or other containers with examples of such devices being found in U.S. Pat. Nos. 2,775,268, 2,937,670, 2,719,661, 3,217,760, and 3,602,271. While the prior known devices for filling containers with food particles have in most instances worked satisfactorily with respect to some types of food particles, problems of operation have been encountered when employing such devices with other type food particles. For example, while one type machine may be quite satisfactory for filling containers with particles such as cherries, pickles or the like, such an apparatus frequently will not provide the necessary uniformity of feed required for satisfactory operation when feeding different type particles such as salad, corn, peas or other type food particles. Many of the problems encountered when changing over from one type food particle to another are resultant from problems in returning overflow of excess food particles back to the inlet of the filling machine for return to the filling area of the machine. Such return of the excess food requires a conveying of the excess particles from the filling area back to the infeed conveyor and it is necessary that such return flow be maintained at a constant rate with as little variation as possible in the continuous return of the excess food particles to the infeed conveyor. This desirable result has been difficult to achieve since the conveyor means for redepositing the excess food particles on the infeed conveyor must work satisfactorily for a wide variety of particles in order to provide versatility for the filling machine. Unfortunately, the prior known devices have not been capable of providing the desired versatility.

Therefore, it is the primary object of this invention to provide a new and improved container filling apparatus for filling containers with food particles.

Obtainment of the object of this invention is enabled through the provision of an elongated conveyor means extending inwardly from the upstream end of the machine and providing a continuous infeed of food particles. The upper flight of the conveyor supports the food particles as they are fed inwardly into the filling machine and a plurality of deflector plates are oriented closely adjacent the upper flight in the filling area portion of the machine for transversely deflecting the food particles from the infeed conveyor belt onto a slide plate extending along one edge of the conveyor belt. The deflector plates are spaced progressively more closely adjacent the edge of the conveyor belt from which the food particles are dropped from downstream to upstream with respect to the upper flight of the conveyor belt.

A container conveyor is provided to extend through the filling area in which the food particles are falling for conveying a continuous line of empty containers through the falling cascade of food particles so that the containers are filled by the particles falling therein. However, the operation of the device is such as to require an excess flow of downwardly falling food particles in the cascade in order to achieve complete filling of all of the containers. The excess food particles must be returned to the infeed conveyor and this is accomplished by means of an overflow return conveyor extending beneath the container conveyor and through the filling area. Consequently, the excess food particles fall onto the overflow return conveyor which then returns them to the upstream end of the machine and deposits the excess food particles on a lifting conveyor in the form of a cleated belt having inwardly extending cleats about its entire periphery. The cleated belt extends upwardly in a generally rectangular loop with the upper flight of the loop extending over the infeed food conveyor so that the excess particles are lifted upwardly by the cleated belt and then dumped onto the upstream end of the infeed food conveyor to be reconveyed through the device and cascaded downwardly in the filling area.

The cleated belt of the lifting conveyor comprises a main belt portion from which the inwardly extending cleat members extend unitarily with the main belt portion being supported by means of edge chains mounted on sprockets driven by electric motor means. This construction has been found to be uniquely effective in providing a continuous and uniform redeposit of the excess food particles on the infeed food conveyor member regardless of the particular type food particles being conveyed.

A better understanding of the subject invention will be enabled when the following written detailed description is read in conjunction with the appended drawings in which:

FIG. 3 is a sectional view taken along lines 3—3 of FIG. 2.

Figure 1:
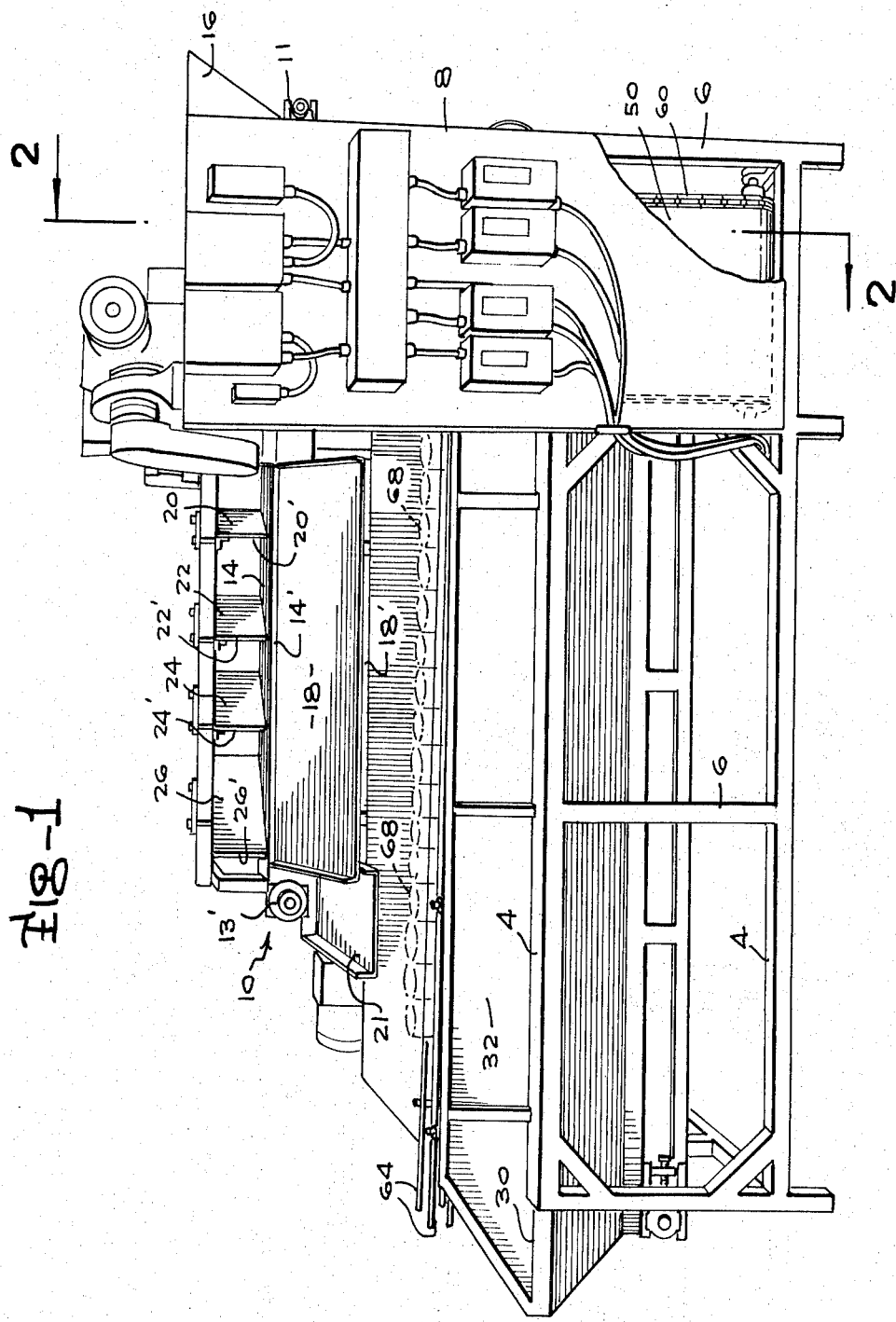
FIG. 1 is a side elevational view of the preferred embodiment of the invention.

Attention is initially invited to FIG. 1 of the drawings which illustrates the preferred embodiment which is in the form of a supporting frame comprising horizontal frame members 4 and vertical frame members 6 with a power control panel 8 supporting circuitry elements for controlling the various motors for operating the electrically driven conveyor apparatus.

Figure 2:
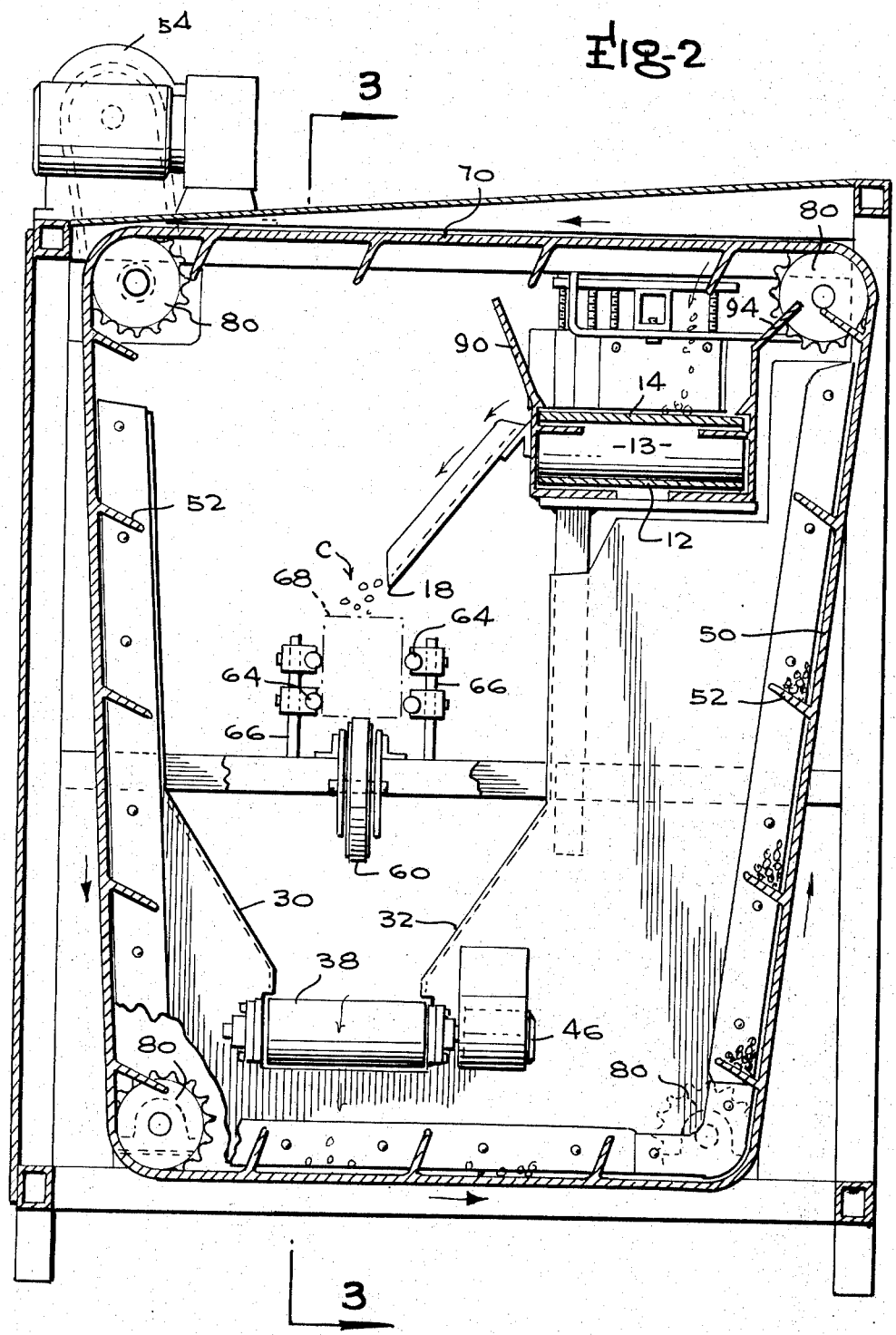
FIG. 2 is a sectional view taken along lines 2—2 of FIG. 1.

An infeed food conveyor generally designated 10 and comprising a power driven belt 12 mounted on an adjustable upstream roller/bearing assembly 11 and a downstream roller 13 mounted in a bearing assembly 13' having an upper flight 14 receives a continuous flow of food particles from an infeed hopper 16. Motor means (not shown) serves to drive the upper flight 14 in a conventional manner from the right to left as viewed in FIG. 1 for conveying the food particles deposited on the conveyor by the feed hopper 16 from which the particles move inwardly to a filling area generally defined by the extent of a slide member 18 illustrated in FIG. 1. Slide member 18 extends downwardly adjacent one edge of the upper flight 15 and four deflector plates 20, 22, 24 and 26 extending downwardly adjacent the upper flight are provided for deflecting the food particles over one edge of flight 14 onto the slide 18. The food particles deflected on the slide 18 move downwardly along the slide to fall from the lower edge 18' of the slide to form a cascade of particles C as shown in FIG. 2.

It is to be noted that the deflector plates 20, 22, 24 and 26 are oriented so that the edge 20' of the upstream plate 20 facing the viewer in FIG. 1 is spaced inwardly from the edge 14' of the horizontal flight 14 over which the food particles are deflected onto slide 18 a substantial distance from edge 14. Similarly, the edges 22', 24' and 26' of deflector plates 22, 24 and 26 are progressively spaced more closely adjacent the edge 14' of the upper flight 14. Consequently, uniform deposit of food particles is achieved along the entire length of the slide 18 to provide a uniform cascade C over edge 18' and any particles not deposited on the slide 18 are dumped onto an overflow trough 21 to fall downwardly in an obvious manner.

A container conveyor is provided in the form of a driven belt member 60 extending over an upstream supporting pulley member 62 and a downstream pulley (not shown) and driven by electric motor means in a conventional manner. Horizontally extending guide rods 64 are mounted above the conveyor belt member 60 in an adjustable manner on vertical posts 66 for the purpose of guiding a plurality of containers 68 through the filling area defined by the length of slide 18. Food particles in cascade C are consequently deposited in the containers 68 so as to completely fill the containers and any excess food particles then fall downwardly into a V-shaped trough having side walls 30 and 32 as shown in FIG. 2.

An overflow return conveyor member in the form of a belt 38 is mounted between and beneath the walls 30, 32 for receiving the excess food particles not deposited in containers 68. A motor 46 drives the belt 38 from left to right as viewed in FIG. 3 for returning the excess food particles to the upstream end of the machine.

It is to be noted that the right, or discharge, end of the upper flight of belt 38 extends inwardly into a generally rectangular loop formed by an elevating conveyor member comprising a cleated belt in the form of a main belt member 50 from which a plurality of cleat members 52 extend unitarily with the cleat members 52 being inclined in the direction of movement of the main belt member 50 as indicated by the arrows in FIG. 2. Power to the belt member 50 is provided by a motor 54 with the belt member 50 being supported and driven by first and second chains 56 and 58 supported on sprocket members 80 in a rectangular array as clearly shown in FIG. 2.

Therefore, it is to be noted that the excess food particles returned by the conveyor belt 38 are dumped onto the interior of the rectangular loop defined by belt member 50 to be engaged by the cleats 52 and lifted upwardly. The infeed end of the conveyor 10 extends beneath the upper flight 70 of the belt member 50 so that food particles carried by the cleats 52 are dumped onto the upper surface of the flight 14 to be reconveyed into the machine for subsequent deposit on slide 18 etc. Guide plates 90, 94 aid in the depositing of the excess food particles onto the upstream end of the upper flight 14 in an obvious manner.

The aforediscussed construction is such that the machine is uniquely capable of handling a wide variety of food particles with little or no adjustment being required. While numerous modifications of the subject invention will undoubtedly occur to those of skill in the art, it is to be understood that the spirit and scope of the invention is to be limited solely by the appended claims.

I claim:

1. A food packing machine comprising an infeed food conveyor for providing a continuous cascade of randomly positioned food particles in a filling zone, a container conveyor extending through said filling zone for conveying empty containers through said cascade of food particles to be filled by said cascade of food particles, said cascade of food particles providing an excess flow of food particles in excess of the capacity of the containers moving through said continuous cascade of food particles, overflow return conveyor means for receiving excess food particles from said cascade not deposited in said containers and removing said excess food particles from said filling area and lifting conveyor means comprising a cleated belt member formed in a closed loop extending directly over said infeed-conveyor and having inwardly extending cleats for receiving said excess food particles from said overflow return conveyor and redepositing said excess food particles on said infeed conveyor upstream of said filling area.

2. The invention of claim 1 wherein said infeed food conveyor means comprises a movable belt formed in a loop having a horizontally extending upper flight supporting food particles being conveyed and power means drivingly connected to said belt.

3. The invention of claim 2 additionally including deflector plate means mounted in said filling area adjacent said upper flight for deflecting food carried by said upper flight laterally off one edge of said upper flight onto a food slide down which the particles slide to fall from a lower edge thereof to form said cascade of food particles.

4. The invention of claim 3 wherein said cleated belt comprises a main belt member, inwardly extending cleat members extending unitarily from said main belt member and inclined in the direction of movement of said main belt member and chain means adjacent each edge of said main belt member for supporting and driving said main belt member.

5. The invention of claim 4 wherein said overflow return conveyor means comprises a driven belt conveyor.

6. The invention of claim 5 wherein said container feeding conveyor means comprises a driven container feed belt and container guide rods mounted adjacent and above said container feed belt for guiding containers through said filling area.

7. The invention of claim 6 additionally including converging trough means extending through said filling area for directing said excess food particles onto said overflow return belt member.

8. The invention of claim 7 wherein said deflector means comprises a plurality of deflector plates with the deflector plates being spaced along the length of said upper flight infeed conveyor belt and canted at an angle with respect to the axis of the upper flight with the deflector plate nearest the direction from which the upper flight is moving being spaced with its downstream edge a greater distance from said one edge of the upper flight and the downstream edges of subsequent downstream deflector plates being positioned progressively closer to said one edge of said upper flight from which the particles fall.

9. The invention of claim 1 additionally including supporting means supporting and orienting said cleated belt member in a generally rectangular loop configuration defined by an upper flight, a lower flight and first and second side flights.

10. The invention of claim 9 wherein the discharge end of said overflow return conveyor extends inwardly within the periphery of said rectangular loop configuration of said lifting conveyor means.

11. The invention of claim 10 wherein said infeed food conveyor means comprises a movable belt loop having a horizontally extending upper flight supporting food particles being conveyed and power means drivingly connected to said belt.

12. The invention of claim 11 additionally including deflector plate means mounted in said filling area adjacent said upper flight for deflecting food carried by said upper flight laterally off one edge of said upper flight onto a food slide down which the particles slide to fall from a lower edge thereof to form said cascade of food particles.

13. The invention of claim 12 wherein said cleated belt comprises a main belt member, inwardly extending cleat members extending unitarily from said main belt member and inclined in the direction of movement of said main belt member and chain means adjacent each edge of said main belt member for supporting and driving said main belt member.

14. The invention of claim 13 wherein said overflow return conveyor means comprises a driven belt conveyor.

* * * * *